Oct. 29, 1929.　　　W. H. MYERS　　　1,733,899
COMBINATION TOP FOR GAS RANGES
Filed Aug. 23, 1928　　2 Sheets-Sheet 1

WILLIAM H. MYERS
INVENTOR.

BY
Mason Fenwick Lawrence
ATTORNEYS.

Oct. 29, 1929.  W. H. MYERS  1,733,899
COMBINATION TOP FOR GAS RANGES
Filed Aug. 23, 1928  2 Sheets-Sheet 2
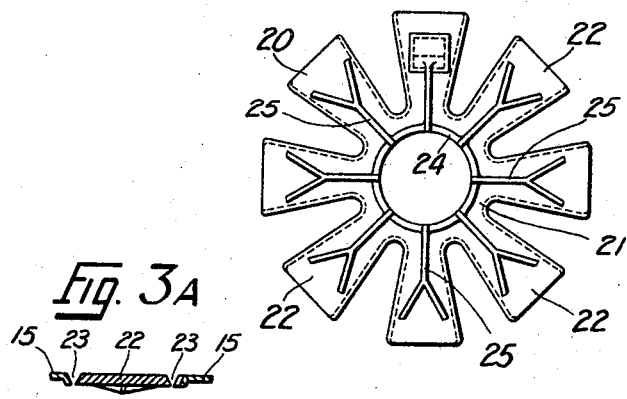
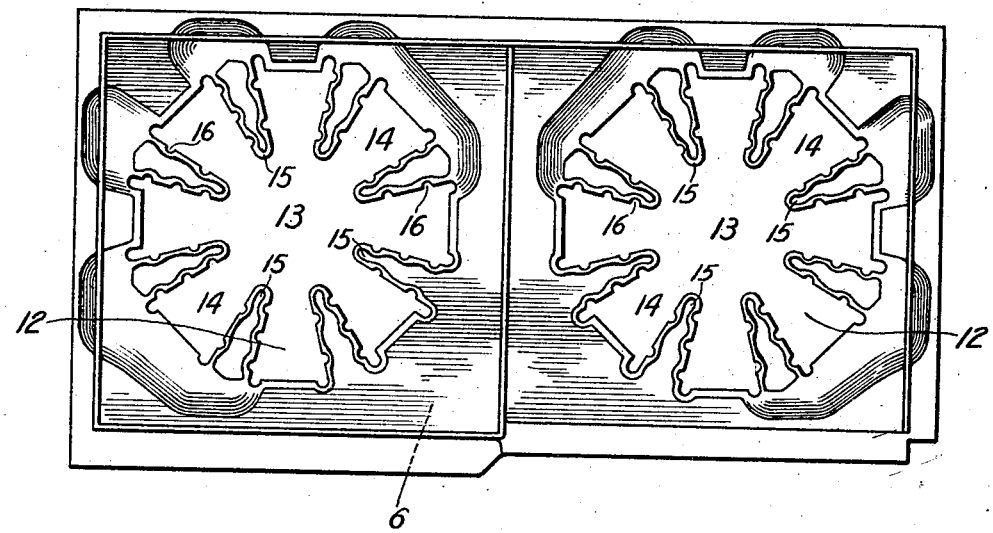
WILLIAM H. MYERS
INVENTOR.
BY
Mason Fenwick & Lawrence
ATTORNEYS.

Patented Oct. 29, 1929

1,733,899

UNITED STATES PATENT OFFICE

WILLIAM H. MYERS, OF BROOKLYN, NEW YORK

COMBINATION TOP FOR GAS RANGES

Application filed August 23, 1928. Serial No. 301,621.

My invention relates to combination tops for gas ranges or other cooking apparatus of the general character illustrated in my prior application for patent filed November 17th, 1927, Serial No. 233,904, in which an open top having openings over the respective burners with inward projections to support the cooking utensils is provided with a removable cover for each opening corresponding to the opening, by which all the advantages of a closed top are also obtained.

The primary object of my invention is to provide a construction of the top and cover by which in co-operation with the utensil placed on the cover, the air drawn upward through the burner with the burning gases, will be thoroughly mixed therewith and the greatest possible amount of heat realizable therefrom utilized in heating the utensil before being exhausted.

To this end, as well as other ends, my invention briefly comprises, in its present preferred embodiment, a top having burner openings having main and extension openings corresponding to the form of the burner, and rest arms for the utensil between the extension openings, and a removable cover having a hub to cover the main opening and arms to cover the extension openings between the top arms, the cover and top arms being formed with horizontal channels leading from the combustion chamber to the outside of the utensil, so as to form with the bottom of the utensil effective heating and escape flues for the hot air and gases, as hereinafter more fully set forth.

My invention also comprises various other new and useful features hereinafter described and claimed.

In order that my invention may be fully understood, I shall first describe in detail the mode in which I at present prefer to carry the invention into practice, and then particularly point out the invention in the claims.

Reference is to be had to the accompanying drawings forming part of this application for patent, in which like parts are designated by the same numbers in all the figures.

Figure 3A is a cross-section on the line 3A—3A, Figure 1.

Figure 4 is an inverted plan view of the cover.

Figure 5 is an inverted plan view of the top.

Figure 1:
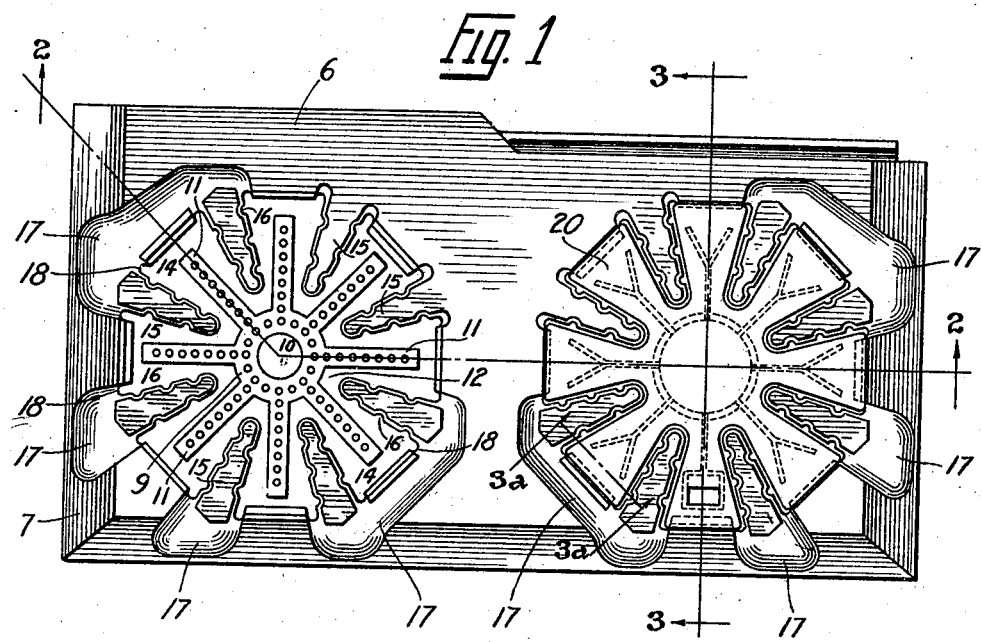
Figure 1 is a plan view of a combination top embodying my invention.
Figure 2:
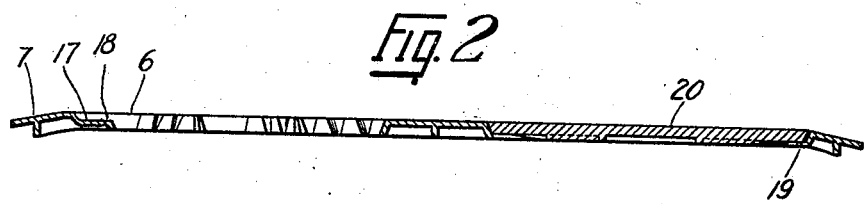
Figure 2 is a cross-sectional view of the same on the line 2—2, Figure 1.
Figure 3:
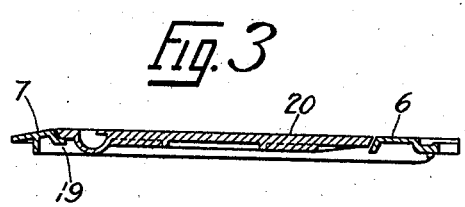
Figure 3 is a cross-sectional view on the line 3—3, Figure 1.

In the embodiment of my invention shown in the drawings, 6 designates the fixed top of the gas range, which is preferably inclined at its outer part 7, downward to the frame, so that the cooking surface of the top 6 is slightly elevated above the frame.

9 designates one of the gas burners, which in this illustration of my invention is formed of a central open hub or ring 10, and radially or outwardly projecting arms 11.

One or more burners 9 may be used for each range. The top 6 here illustrated is part of a unit having two burner openings 12, centralized over the respective burners 9.

Each burner opening 12 is formed in this example of my invention of a central opening 13 over the hub of the burner, and a number of radial or lateral extensions 14 of said central opening, the central opening 13 being over and corresponding to the open hub 10 of the burner and the lateral openings 14 being over and corresponding to the outwardly projecting arms 11 of the burner.

It will be evident however that the form of the whole burner opening, as well as of the burner corresponding thereto, may be greatly varied from this specific example of my invention, without departing from the spirit and scope of my invention.

Between the radial openings 14, the top is formed with corresponding inwardly projecting and tapering arms 15 which serve, in conjunction with the part of the top around the burner opening, as a rest for the utensils to be heated.

The opposite sides of each rest arm 15 are preferably beveled downwardly and outwardly and formed with roughly vertical or cross-corrugations 16, for a purpose hereafter described.

Around each burner opening 12 are formed depressions 17 in the top extending outside the utensil and opening horizontally into the radial openings 14 through channels 18 in the top on each side of the respective rest arms 15, also for a purpose hereafter described.

In some of the radial openings 14 are formed on the top, preferably at the outer ends of the openings, shelves 19, depressed below the top, to support the removable cover 20.

When the cover 20 is removed, the burner opening 12, with the rest arms 15, peripheral depressions 17, and short channels 18, forms an open top of the most effective character by which the heated air and gases rising from the burner are brought directly against the bottom of the utensil and thence escape laterally through the horizonal flues formed by the bottom of the utensil, the radial openings 14, the short channels 18, and the depressions 17, extending outside the utensil. During the passage of the hot air and gases through these horizontal flues, after they are checked and commingled by the bottom of the utensil, they are in direct contact with the bottom of the utensil, and thus the greatest possible amount of the heat units are utilized in heating the utensil, with great resulting economy.

When it is desired to use this combination top as a closed top with its special advantages, the removable cover 20 is placed over the burner opening. The cover 20 is, in this example of my invention, formed with a central hub 21, to fit and cover the central burner opening 13, and radial arms 22, corresponding to the radial openings 14, but slightly narrower than the same and preferably beveled, oppositely to the arms 15, on their opposite sides as shown. The construction is such that when the cover 20 is in place, the top of the cover 20 will be flush with the tops of the rest arms 15 and also the top 6 itself, forming the cooking surface, but horizontal radial channels 23 will be formed between the adjacent sides of the top rest arms 15 and the radial cover arms 22.

These channels 23 connect with the short channels 18, and form in conjunction therewith, the peripheral depressions 17, and the bottom of the utensil, horizontal flues, exterior to the combustion chamber below the top and cover, through which the heated air and gases, brought directly against the cover and top, and checked, commingled, and deflected thereby, escape.

During the passage of the hot air and gases through the horizontal flues thus formed, they are in direct contact with the bottom of the utensil and the greatest possible amount of the heat units is thus utilized in heating the utensil.

The ringed rib 24 and the radial ribs 25 on the bottoms of the hub and arms respectively of the cover, serve in conjunction with the said hub and arms, to check, break up, thoroughly mix and deflect the hot air and gases before passing through the horizontal flues described.

The described correspondence of the burner arms and cover arms serves to direct the flames from each burner arm to the corresponding cover arm, heating and escape flues, and thus prevents interference of the flames from the several burner arms with each other.

The cross-corrugations in the top arms 15, which may be duplicated in the sides of the cover arms if desired, serve as cross ducts to connect the horizontal flues with the combustion chamber below the cover and to prevent the closing of the horizontal flues, in the event of undue lateral expansion of the top and cover arms.

It is evident that many changes may be made in the details of the construction and arrangement herein shown and described, without departing from the boundaries of my invention as defined in the following claims.

By the word "horizontal" in the description and claims, I mean of course substantially horizontal or traversing the top of the range.

I claim as my invention:

1. A combination top for gas ranges and the like formed with a burner opening over each burner, a cover for each burner opening, and horizontal upwardly open channels extending from the burner openings beyond the utensil area to form, with the bottom of the utensil, horizontal heating and escape flues for the hot air and gases.

2. A combination top for gas ranges and the like, formed with a burner opening over each burner having main and lateral extension openings with arms between the extension openings, and provided with a removable cover having a hub to cover the main opening and arms approximately to cover the extension openings, the cover arms and the top arms being formed along their adjacent sides with horizontal open channels forming, with the utensil, flues for the passage of the hot air and gases.

3. A combination top in accord with claim 2, in which depressions are formed in the top outside the extension openings and connected by short channels with the channels between the cover and top arms.

4. A combination top in accord with claim 1, in which the horizontal channels are connected by cross ducts with the combustion chamber below the cover.

5. A combination top in accord with claim 2, in which the sides of the top arms are beveled downwardly and outwardly to form with the cover arms, horizontal gas channels.

6. A combination top in accord with claim 2, in which the adjacent sides of the top arms and intervening cover arms are beveled to form horizontal gas channels therebetween.

7. A combination top in accord with claim 2, in which the cover is formed on its underside with ribs on its hub and arms to break up and deflect the hot air and gases.

In testimony whereof I affix my signature.

WILLIAM H. MYERS.